Dec. 19, 1950 T. SPECHT 2,534,931
CURRENT TRANSFORMER
Filed April 30, 1947
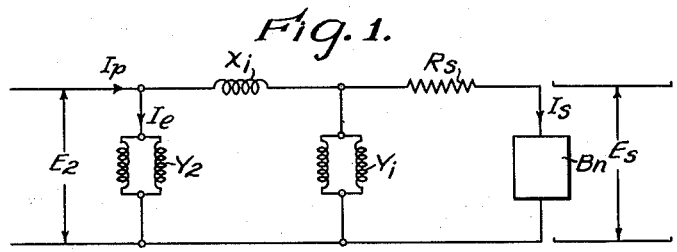
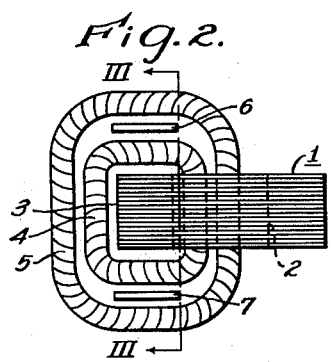
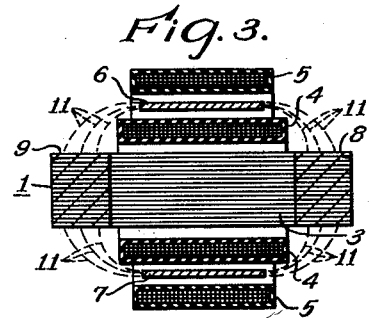
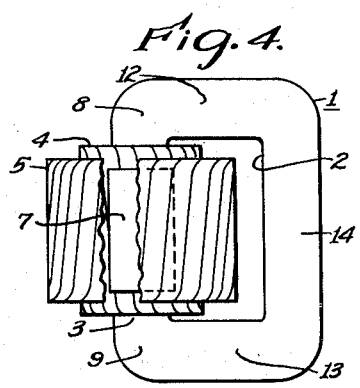
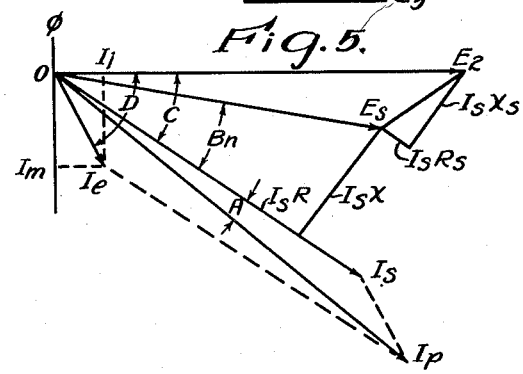
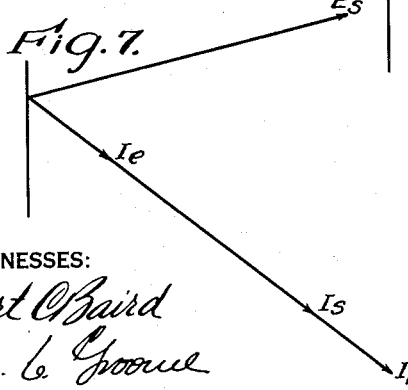
WITNESSES:
Robert C Baird
Nw. C Groove
INVENTOR
Theodore Specht.
BY
Franklin E. Hardy
ATTORNEY Patented Dec. 19, 1950

2,534,931

UNITED STATES PATENT OFFICE 2,534,931

CURRENT TRANSFORMER

Theodore Specht, Sharon, Pa., assignor to Westinghouse Electric Corporation, East Pittsburgh, Pa., a corporation of Pennsylvania Application April 30, 1947, Serial No. 745,026

5 Claims. (Cl. 171—777)

This invention relates to current transformers, and particularly to means for correcting phase angle error in such transformers.

Current transformers are used to step the current in primary circuits down to values suitable for direct connections to instruments, such as measuring instruments for indicating the value of the current flowing in the primary circuit, or relays, or similar devices that are operated in accordance with particular current values. Current transformers are necessary when the magnitude of the current, or the voltage, of the primary circuit would make the design of the instruments impracticable, or where direct connection to the instruments would be dangerous to the operators on account of the voltage. In a current transformer it is important to maintain a consistent ratio of primary circuit current to secondary circuit current as the line current changes. Where the transformer is used for supplying current to a meter for measuring power, the time phase relation between the primary current and the secondary current is also important.

In prior art structures a short circuiting band has been used around the core providing a load circuit which tended to correct the phase angle error. The corrective value through this band, however, varies with the secondary burden so that the phase angle correction varies with the burden. With low burdens quite a large band would be required in order to secure adequate correction and this would result in excessive correction when the burden is high.

An object of my invention is to provide a transformer which will have such electrical characteristics as to provide a minimum angle between the primary current and the reversed secondary current.

It is another object of this invention to provide means for correcting phase angle error in current transformers that is independent of the burden on the transformer.

A further object of my invention is to provide a current transformer that will have a minimum of phase angle error and is designed to supply high power factor burdens.

I accomplish these and other objects of the invention by increasing the internal reactance of the transformer. In accordance with the invention, magnetic shunts are provided in the space between the high voltage and low voltage windings of the transformer in such manner to provide low reluctance magnetic circuit paths for guiding the leakage flux passing between the high voltage and low voltage windings sufficiently close to the area of the core adjacent the ends of the windings as to increase the flow of leakage flux into the core and through the yoke portion of the core. By thus increasing the leakage flux in the transformer core, the internal reactance of the transformer is increased.

In the drawing:

Figure 1 is a diagram illustrating the equivalent circuit of a current transformer.

Fig. 2 is a top plan view of one preferred embodiment of a current transformer structure arranged in accordance with the invention.

Fig. 3 is a sectional view taken along the broken line III—III of Fig. 2.

Fig. 4 is a side elevational view of the current transformer shown in Fig. 2 with parts broken away.

Figs. 5, 6 and 7 are vector diagrams.

Referring to the drawing, Fig. 1 represents the equivalent circuit of a current transformer. The rectangle identified by the reference character $B_n$ designates the burden supplied from the secondary of the transformer, $R_s$ is the secondary resistance, $X_1$ is the transformer internal reactance. $Y_1$ and $Y_2$ are the core exciting admittances for the part of the core not carrying leakage flux, and the part of the core carrying leakage flux, respectively.

By definition, the phase angle of a current transformer is the angle between the primary current vector and the secondary current vector reversed. This angle is conveniently considered as positive when the reversed secondary current indicated by the vector $I_s$ leads the primary current $I_p$ as shown in Fig. 5. The angle between these two current vectors is shown by A. The result is the same whether the vector indicates the secondary current or the primary current reversed. Since the phase angle is considered positive when the secondary current leads the reversed primary current, likewise it is considered negative or lagging when it is behind the reversed primary current in time phase relation. The desirable condition is that the primary current and secondary current shall be 180° apart in time phase relation, in which case the angle A between the two vectors, with one of them reversed will be zero.

In the equivalent circuit shown in Fig. 1, the part $X_1$ is the transformer internal reactance and may not be present or may be very small, depending upon the type of design. It is a function of the leakage flux that travels in the core of the transformer. If this leakage flux, passing between the primary winding and the secondary winding, returns into the core and completes its magnetic circuit path through that portion of the core excluding the winding leg about which the primary and secondary windings are positioned, this leakage flux in the core increases the internal reactance of the transformer. Increasing the internal reactance of the transformer decreases the series power factor of the circuit including the secondary winding and burden, and hence lowers the phase angle A in Fig. 5.

Referring to Figs. 1 and 5 for an analitative study of this circuit, the current through the admittance $Y_1$ will be neglected. The vector $E_2$ is the induced secondary voltage and is at right angles to the flux $\phi$ and in opposition to the primary voltage producing this flux. $E_s$ is the secondary terminal voltage. The difference between the voltage $E_2$ and $E_s$ is due to the voltage drop $I_sZ_s$ in the secondary winding caused by the secondary current $I_s$. The secondary current $I_s$ lags behind the terminal voltage $E_s$ by an angle B whose value depends on the impedance of the load. The impedance drop in the secondary $I_sZ_s$ is made up of two components, the ohmic element $I_sR_s$ in phase with the current $I_s$ and reactive element $I_sX_l$ at right angles to this current. The latter is caused by the magnetic leakage which passes between the primary and secondary coils and returns through the yoke of the iron. The voltage $E_s$ is consumed in sending the current $I_s$ through the impedance of the burden, $I_sR$ being the ohmic drop and $I_sX$ being the reactive drop of this voltage drop.

The primary current $I_p$ is the vector sum of the secondary current $I_s$ and the exciting current $I_e$ drawn by the transformer itself. The exciting current $I_e$ can be resolved into component $I_i$ which supplies the iron loss in the magnetic circuit and the current $I_m$ which overcomes the reluctance of this circuit. It will be observed that the current $I_m$ is in the phase with the magnetic flux which it produces and is 90° out of phase from the current $I_i$.

From Fig. 5 it is evident that the value of the phase angle A is dependent upon the magnitude of the reversed exciting current $I_e$ and the relative phase position of this current and the secondary current $I_s$. The phase position and magnitude of the exciting current $I_e$ depends both upon the characteristics of the magnetic circuit, and also upon the magnetic induction upon which the iron is working. This magnetic induction is proportional to the voltage impressed upon the primary winding, which in turn varies with the secondary voltage required to circulate the load current through the impedance of the secondary winding of the transformer and the external burden. The phase position of the secondary current $I_s$ depends upon the impedance of the secondary winding of the transformer and the power factor of the burden. As the angle B, whose cosine is the power factor of the burden, increases, the phase angle A decreases and becomes zero when the angle C becomes equal to the angle D.

The angle C is the total angle between the induced secondary voltage $E_2$ and secondary current $I_s$ and the angle D is the angle between the induced secondary voltage $E_2$ and the reversed exciting current $I_e$ as shown in Fig. 5. In fact that when the angle C becomes equal to the angle D, the phase angle is reduced to zero is important. This means that if the secondary burden can be arranged to have the proper power factor, this desirable condition can be established and the phase angle error eliminated.

Referring to Figs. 2, 3 and 4, the numeral 1 indicates a magnetic core structure shown as generally rectangular in form and having a rectangular window 2. One of the longer sides 3 of the core structure 1 is used as a winding leg, about which the low voltage, or secondary, winding 4, and the high voltage, or primary, winding 5 is positioned. These two windings are positioned, the one about the other, about a common portion of the core structure. Magnetic shunts 6 and 7 are positioned in the space between the primary and secondary winding in the area through which the leakage flux normally passes. The shunts are magnetic structures used for the purpose of concentrating the leakage flux and offering a low reluctance path of magnetic material for guiding the leakage flux closely adjacent the areas shown at 8 and 9 in Figs. 3 and 4, where the leakage flux may readily enter the core structure as shown by the dotted lines 11 in Fig. 3. The magnetic structures, or shunts, 6 and 7 may consist of groups of laminations of iron or equivalent material and are so positioned with respect to the area between the primary and secondary windings in which the leakage flux passes, and with respect to the core structure, as to guide the leakage flux passing between the secondary and primary windings so as to return into the core in the areas designated generally by the numerals 9 and 9 in Figs. 3 and 4 to complete its magnetic circuit loop through that portion of the core excluding the winding leg 3, namely the portion including the two horizontal core portions 12 and 13 and the outer leg portion 14 as shown in Fig. 4 which together constitute the yoke portion of the core.

Fig. 6 illustrates the vectors $E_s$, $I_s$, $I_p$, and $I_e$ in the same relationship with respect to each other as shown in Fig. 5, and the remaining vectors are omitted to simplify the diagram. By positioning the magnetic structures 6 and 7 as above described, thus causing a large portion of the leakage flux to be guided into the main transformer core to increase the flux density in the yoke portions 12, 13 and 14 of the core, the internal reactance of the transformer is increased and the series power factor of the circuit including the transformer secondary winding and the burden is decreased, causing the vectors $E_s$ and $I_e$ to rotate with respect to the vector $I_s$ to the positions shown in Fig. 7. By a proper degree of increase in the internal reactance of the transformer, this rotation advancing the position of the vectors $E_s$ and $I_e$ eliminates the angle A and brings the vectors $I_s$ and $I_p$ to coincide, thus eliminating phase angle error shown in Figs. 5 and 6.

It will be apparent to those skilled in the art that modifications in the structure illustrated and described may be made within the spirit of my invention and I do not wish to be limited otherwise than in accordance with the scope of the appended claims.

I claim as my invention:

1. A current transformer including a core structure forming a closed magnetic circuit, a primary winding and a secondary winding positioned about a common portion of the magnetic circuit, and means for lowering the phase angle between the primary current and the reversed secondary current by increasing the internal reactance of the transformer including magnetic shunts positioned between the primary winding and secondary winding to guide leakage magnetic flux passing between the primary winding and the secondary winding to increase the leakage flux in the unwound portion of the core and thus increase the flux density in that portion of the core not surrounded by the windings above the flux density in that portion of the core surrounded by the windings.

2. A current transformer including a substantially rectangular magnetic core structure forming a closed magnetic circuit, one side of said rectangular core structure constituting a winding leg portion, a primary winding and a secondary winding positioned about said winding leg core portion, and means for correcting the phase angle error between the current in the primary winding and the current in the secondary winding of the transformer by increasing the internal reactance of the transformer including magnetic shunts in the space between the primary winding and the secondary winding for increasing the leakage flux in the core, the shunts being positioned external of the core structure as to guide leakage magnetic flux between the primary winding and the secondary winding between the areas of the winding legs of the core adjacent the opposite ends of the winding and into the core to complete its magnetic circuit through the yoke portion of the core.

3. A current transformer including a core structure forming a closed magnetic circuit having a winding leg portion and a yoke portion for connecting the ends of the leg portion to complete the magnetic circuit, a primary winding and a secondary winding positioned the one about the other and about the winding leg portion of the core, and means for correcting the phase angle error between the current in the primary winding and the current in the secondary winding of the transformer including magnetic shunts positioned between the primary winding and the secondary winding external of the core structure to guide leakage magnetic flux passing between the primary winding and the secondary winding into the core to increase the flux density in the yoke portion of the core.

4. A current transformer including a core structure forming a substantially rectangular closed single loop magnetic circuit about a rectangular window, one side of the rectangular loop structure constituting a winding leg portion of the core and the remaining three sides constituting a yoke portion of the core for connecting the ends of the winding leg portion to complete the magnetic circuit, a primary winding and a secondary winding positioned the one about the other and about the winding leg portion of the core, and means for correcting the phase angle error between the current in the primary winding and the current in the secondary winding of the transformer by increasing the internal reactance of the transformer including a pair of magnetic shunts positioned between the primary winding and the secondary winding on the opposite sides of the core structure and on the opposite sides of the winding leg portion thereof and terminating adjacent the areas of the core structure joining the winding leg portion and the yoke portion of the core for guiding the leakage magnetic flux passing between the primary winding and the secondary winding into the core to complete its magnetic circuit path through the yoke portion of the core.

5. A current transformer including a core structure forming a substantially rectangular closed single loop magnetic circuit about a rectangular window, one side of the rectangular loop structure constituting a winding leg portion of the core and the remaining three sides constituting a yoke portion of the core for connecting the ends of the winding leg portion to complete the magnetic circuit, a primary winding and a secondary winding positioned the one about the other and about the winding leg portions of the core, and means for lowering the phase angle between the primary current and the reversed secondary current by increasing the internal reactance of the transformer including a pair of magnetic shunts positioned between the primary winding and the secondary winding and terminating close to the areas on the opposite sides of the core adjacent the ends of the windings to concentrate the flow of leakage flux adjacent the ends of the winding leg portion of the core and increase the flux density in the yoke portion of the core above the flux density in the winding leg portion of the core.

THEODORE SPECHT.

REFERENCES CITED

The following references are of record in the file of this patent:

UNITED STATES PATENTS

| Number | Name | Date |
| --- | --- | --- |
| 1,866,345 | Callsen | July 5, 1932 |
| 1,965,739 | Galton | July 10, 1934 |
| 2,168,173 | Sabbah et al. | Aug. 1, 1939 |
| 2,276,032 | Gibbs | Mar. 10, 1942 |
| 2,310,097 | Langguth et al. | Feb. 2, 1943 |
| 2,432,343 | Short | Dec. 9, 1947 |